United States Patent [19]

DeGlopper

[11] Patent Number: 4,794,428

[45] Date of Patent: Dec. 27, 1988

[54] COPIER STAND WITH SORTING BINS

[76] Inventor: Jon E. DeGlopper, 18630 Crest Ct., Brookfield, Wis. 53005

[21] Appl. No.: 158,565

[22] Filed: Feb. 22, 1988

Related U.S. Application Data

[62] Division of Ser. No. 89,666, Aug. 26, 1987.

[51] Int. Cl.[4] ........................ G03B 27/58; G03B 27/62
[52] U.S. Cl. .......................................... 355/72; 355/75
[58] Field of Search .................. 355/3 SH, 72, 75, 21, 355/133; 211/134, 153

[56] References Cited

U.S. PATENT DOCUMENTS

| | | | |
|---|---|---|---|
| 2,384,019 | 9/1945 | Dye | 355/75 |
| 3,167,997 | 2/1965 | Robin | 355/75 X |
| 4,097,147 | 6/1978 | Portewig | 355/72 X |
| 4,444,493 | 4/1984 | Webster et al. | 355/75 |
| 4,624,556 | 11/1986 | Rodriguez | 355/75 |

FOREIGN PATENT DOCUMENTS

| | | | |
|---|---|---|---|
| 6937 | 1/1985 | Japan | 355/75 |

*Primary Examiner*—Richard A. Wintercorn
*Attorney, Agent, or Firm*—Andrus, Sceales, Starke & Sawall

[57] ABSTRACT

A stand for a copy machine or the like includes a plurality of sorting bins for manually individually sorting and collating copies of documents produced by the copy machine. The stand includes an upper surface for supporting and spacing the copy machine above a floor or like surface, and a plurality of supporting legs disposed below the upper support surface. A plurality of sorting bins are disposed below the upper support surface and in the vicinity of the output area of the copy machine, so that copies produced by the copy machine may be collated or sorted into sets corresponding to the original document using the plurality of sorting bins.

7 Claims, 2 Drawing Sheets

COPIER STAND WITH SORTING BINS

This is a division of application Ser. No. 089,666 filed Aug. 26, 1987.

BACKGROUND AND SUMMARY

This invention relates to a stand for supporting a copy machine or the like, and more particularly to a stand having a collating feature intended for use with copy machines.

With recent advances in technology, it has become more economically feasible for individuals and businesses of any size to purchase or lease photocopying machines. Potocopy machines, such as personal cartridge copiers, generally have a single output tray, which receives the output of copies produced by the machine. Many older model full size copiers sold during the past 20 years also operate on this principle. It is generally not economically or technologically feasible to provide an automatic collating attachment or other device for these machines which sorts and collates copies into sets corresponding to sets of original documents.

Automatic collating attachments are available as expensive options for most of the higher end, more expensive, copiers. However, these collating attachments can be a major cause of service problems and delays on many models.

It is known to support a copy machine, such as a personal cartridge copier or the like, on a table, copier stand or other such supporting surface. The table generally provides a substantial amount of extra surface area around the copier. This surface area of the table is usable when sorting a plurality of copies of pages from a multiple page original into corresponding multiple page sets of duplicates. To do this, the operator simply lays the individual copies of each sheet onto the surface of the table one on top of another This forms a plurality of stacks of copies, with each stack being a copy of the original multiple page document.

The drawback to this procedure is that a table top provides a relatively unstable surface for supporting a copier. This is due to the substantial lateral forces and vibration produced by such a copier during its operation, and the inability of a table to withstand such forces, the result of which is lateral movement of the table top. Further, such an arrangement occupies an unwarranted amount of space in an office or room, which, for some business enterprises and personal users, is at a premium.

There is thus a need for a copier stand which provides an adequate stable support for a copy machine, and also provides space usable for sorting and collating copies produced by such a machine. There is further a need for a copier stand which provides a back-up or auxiliary copy sorting and collating feature for copiers provided with an automatic collating attachment, which is capable of facilitating copy sorting and collating when the collating attachment breaks down.

The present invention addresses such needs by providing a copier stand which is stable and compact, and which incorporates a sorting feature. In accordance with the invention, a manual sorting stand for a copy machine, which is capable of producing a plurality of copies of a multi-page document, comprises a support means for supporting the copy machine and spacing the machine above a floor or similar surface. Manual collating or sorting means is connected below the support surface on which the copy machine rests. Copies of the multi-page document can be sorted and collated into the manual collating or sorting means. The support means generally includes an upper support surface on which the copy machine rests, and a support structure below the upper support surface and connected thereto, for supporting and spacing the copy machine above the floor. The manual collating or sorting means may comprise a plurality of individual sorting bins connected to the support means and disposed below the upper support surface on which the copy machine rests.

The manual sorting bins are preferably disposed in horizontal and vertical alignment, and two or more vertical rows of sorting bins are preferably provided.

BRIEF DESCRIPTION OF THE DRAWINGS

The drawings illustrate the best mode presently contemplated of carrying out the invention.

In the drawings.

DETAILED DESCRIPTION

Figure 1:
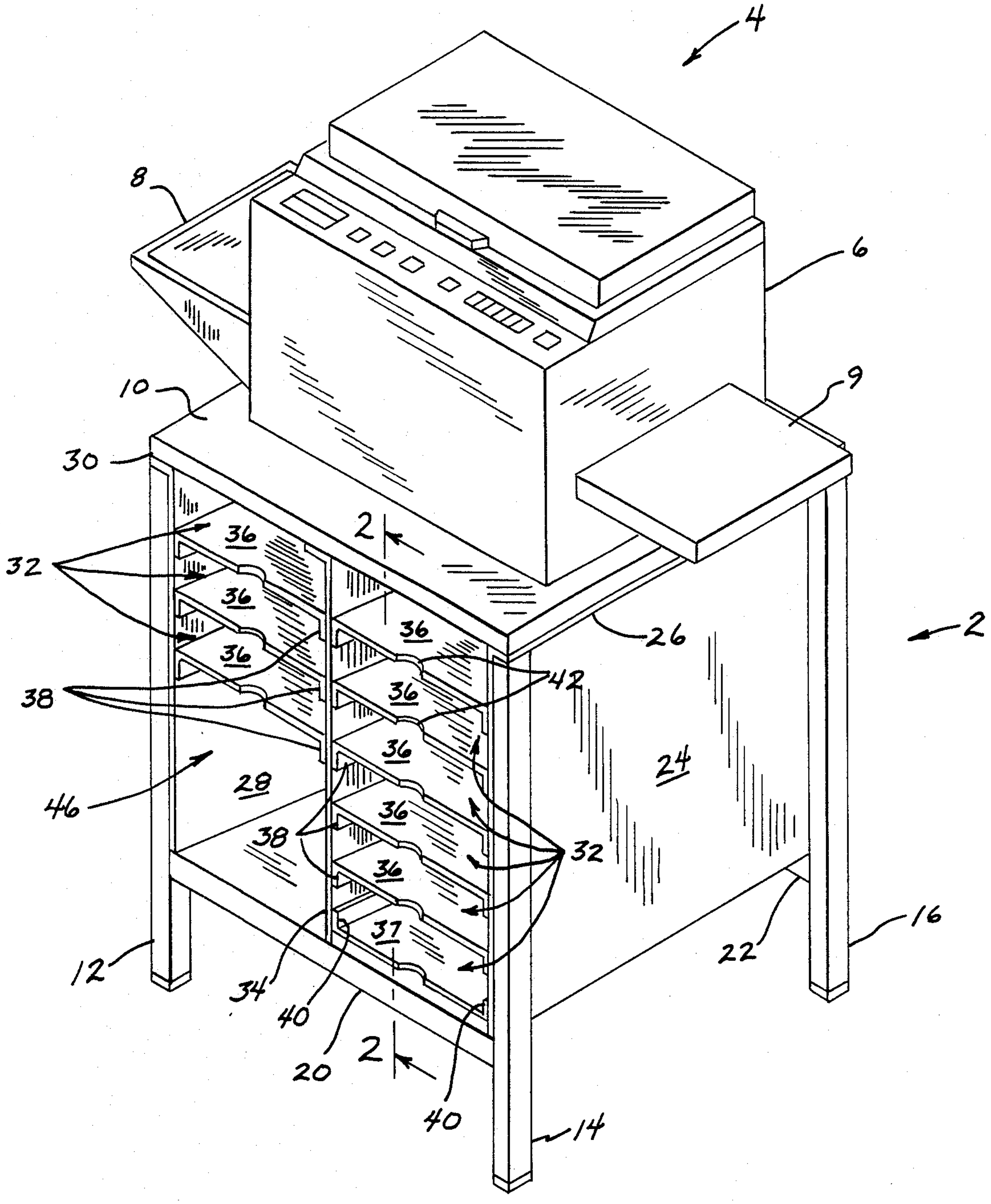
FIG. 1 is an isometric view showing the support stand of the present invention and a copier resting thereon.

With reference to FIG. 1, the present invention provides a manual collating or sorting support stand 2 for a copy machine 4. While the invention will be described hereafter with reference to a copy machine such as shown at 4, the invention is usable with any type of machine which reproduces an original document and contains a single output station for receiving copies of an original document. Copy machine 4 includes a copying unit 6 which functions to copy an original document when placed therein, and an output tray 8 connected to copying unit 6 for receiving one or more copies of the document produced by copying unit 6. Copy machine 4 also includes a paper tray 9 which contains blank paper onto which copies are made.

Support stand 2 of the present invention includes an upper support surface 10 adapted to receive copying unit 6. Upper support surface 10 is generally rectangular in plan, and has a support leg provided at each corner thereof, such as shown at 12, 14, 16 and 18. Support stand 2 is further provided with a pair of lower cross brace members 20, 22 extending between the legs. As shown in FIG. 1, lower cross brace member 20 extends between and is connected to legs 12 and 14, and lower cross brace member 22 extends between and is connected to legs 16 and 18. The purpose of the cross brace is to provide support to dampen sideways (left to right) motion of movable top copiers.

A side panel 24 is provided between legs 14 and 16. Side panel 24 has a perpendicularly extending lip 26 at its top, which is disposed between the upper ends of legs 14, 16 and the underside of upper support surface 10. Connection of legs 14, 16 to upper support surface 10 by any suitable means, such as by mechanical fasteners, thus secures side panel 24 at its top to legs 14, 16 through lip 26. Similarly, a side panel 28 is provided between legs 12, 18, with a lip 30 disposed between the upper ends of legs 12, 18 and the underside of upper support surface 10.

A plurality of sorting bins 32 are provided below upper support surface 10 between side panels 24 and 28. The bins 32 are arranged in two vertically aligned side-by-side rows, with a central vertical interior panel 34 separating each row. Vertical panel 34 extends between and is connected to the underside of upper support surface 10 and the upper surface of lower cross brace members 20, 22.

Bins 32 are formed by a plurality of identical panels 36 and a bottom panel 37, all of which are disposed between central vertical panel 34 and side panels 24 and 28. Each panel 36 has a depending lip 38 provided along its edge portions adjacent side panel 24 or 28 and vertical panel 34. Bottom panel 37 has an upstanding lip 40 along its edge portions. Depending lip portions 38 and upstanding lip portions 40 may be attached to side panels 24, 28 and central vertical panel 34 by any suitable means. One such means of attachment is mechanical fasteners, such as pop rivets or the like.

As best shown in FIG. 1, panels 36 and 37 are provided with a central cut-out semicircular portion 42.

Figure 2:
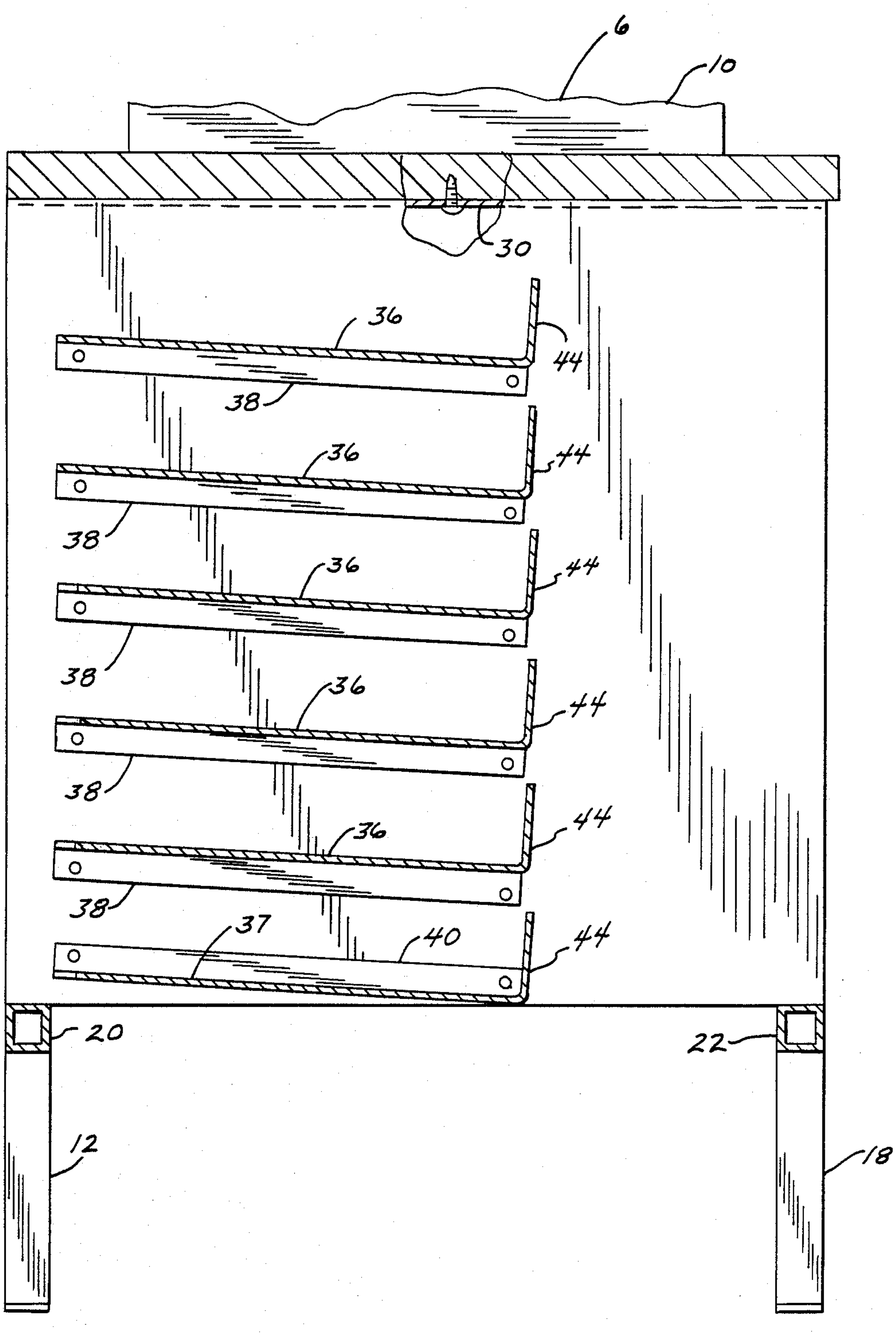
FIG. 2 is a sectional view taken generally along line 2—2 of FIG. 1.

As shown in FIG. 2, panels 36 and 37 are provided with an upstanding back wall portion 44, which defines the rear end of each bin 32. As also shown in FIG. 2, panels 36 and 37 are disposed so as to slope rearwardly within the interior of copier stand 2. The slopnng of panels 36 and 37 rearwardly ensures that copies placed in the bins 32 will remain within the bin after such placement.

The depth of the storage bins 32 is slightly less than the length of a piece of paper (11" letter or 14" legal size) to aid in the easy removal of the manually collated sets of copies. The depth of the manual collating slots is less than the width of the copier stand, which of necessity must be wider to support the full width of the copier that sits on top of support stand 2.

Stand 2 may also incorporate an open storage area 46. Open storage area 46 is used for storing extra toner, extra cartridges for personal copiers (either drum or toner cartridges) or personal effects of the person using the copier. Open storage area 46 may or may not have a door on it.

As shown in the drawings, a larger bin, such as shown at 46, may be provided in the interior of collating copier stand 2. The storage area 46 may alternatively be used for storage of extra paper or the like. Alternatively, it is recognized that any other satisfactory means of storing extra paper in conjunction with copier stand 2 may be utilized.

The above-described structural components of copier stand 2 provide a stable and compact copier stand having a number of bins 32 for sorting copies of documents as they are produced by copy machine 4. Each bin 32 has an open front leading to a substantially closed compartment defined by bottom panel 36 or 37 at the top and bottom, central vertical panel 34 and side panel 24 or 28 at the sides, and back wall 44 at the rear.

As mentioned, the purpose of bins 32 is for sorting or collating copies of documents as they are produced by copy machine 4. In operation, copy machine 4 first produces a plurality of copies of a single sheet from a multiple page original document. The copies are output into output tray 8, after which the operator removes the copies therefrom and places them individually within bins 32 of copier stand 2 so that each bin 32 contains an individual copy of the original sheet from the mutliple page original document. Thereafter, when a plurality of copies of another sheet from the original document are produced by the copy machine, the copies are removed and again placed in the bins atop of the previously-mentioned copies of the first original. This process is repeated as necessary to create a plurality of sets of copies of a multiple page original document. That is, with a multi-page original document, multi-page copies of the original can be easily produced by manually sorting the copies of the original pages during or after the copying process. This type of manual sorting is much easier and more efficient than creating separate piles of copied documents on top of a table or other such supporting surface.

After the sets of copies of the original document are sorted into bins 32, the sets of copies are removed therefrom and fastened together, such as by stapling. Removal of the sets of copies from bins 32 is facilitated by cut-out portions 42 in panels 36 and 37. Cut-out portions 42 accommodate a finger or thumb of the operator when grasping a set of copies disposed within a bin 32.

The sorting bins 32 are disposed so as to be substantially in the vicinity of the output tray 8 of copy machine 4. With such placement of bins 32, the operator of the copy machine can perform both copying and sorting operations while essentially standing in one place.

While copier stand 2 has been described as being constructed of metal, it is recognized that any suitable material may be employed.

It is recognized that various alternatives and modifications are contemplated as being within the scope of the following claims particularly pointing out and distinctly claiming the subject matter regarded as the invention.

I claim:

1. In combination, a copy machine having a top which moves back and forth along a first lateral direction when said copy machine is copying a document, and a manual sorting stand for said copy machine, said manual sorting stand comprising an upper support surface for receiving said copy machine; a support structure disposed below and connected to said upper support surface for supporting and spacing said copy machine above a floor or like surface, said support structure including one or more brace members extending substantially parallel to said first lateral direction of movement of said movable top of said copy machine for bracing said upper support surface against movement and vibration induced by said movable top of said copy machine during operation; and manual sorting means comprising a plurality of individual sorting bins connected to said sorting stand, each said sorting bin having an open area for receiving copies therein for manually individually sorting copies of a document, produced by said copy machine.

2. The combination of claim 1, wherein said plurality of sorting bins are disposed in vertical alignment.

3. The combination of claim 2, wherein said plurality of vertically aligned sorting bins are located adjacent the output area of said copy machine.

4. The combination of claim 2, wherein said individual sorting bins are arranged so as to provide two or more side by side vertically aligned rows of bins.

5. The combination of claim 1, wherein said support structure is substantially rectangular in plan and has a plurality of support legs, with at least one said support leg disposed at each corner of said support structure, said support legs being connected at their upper ends to said upper support surface.

6. The combination of claim 5, wherein said one or more brace members comprise a pair of lower brace members, each said brace member extending between two of said support legs and being disposed toward the lower ends thereof.

7. In combination, a copy machine having a top which moves back and forth along a first lateral direction when said copy machine is copying a document, and a manual sorting stand for said copy machine, said manual sorting stand comprising an upper support surface for receiving said copy machine; a plurality of legs fixedly secured to said upper support surface and extending downwardly therefrom so as to space said upper support surface above a floor or like surface; a pair of lower brace members extending substantially parallel to said first direction of lateral movement of said movable top of said copy machine, each said lower brace member extending between two of said support legs and being disposed adjacent the lower ends thereof for bracing said upper support surface against movement and vibration induced by said movable top of said copy machine during operation; and a plurality of sorting bins disposed below said upper surface and interconnected with said legs, each said bin being adapted to receive an individual copy of a document produced by said copy machine so that, when a plurality of copies of a multiple page document are made on said copy machine, said plurality of copies can be individually manually sorted into said plurality of sorting bins to furnish a plurality of sorted sets of copies of said multiple page document.

* * * * *